April 30, 1940. E. W. SMITH 2,199,229
STORAGE BATTERY
Filed Jan. 30, 1937
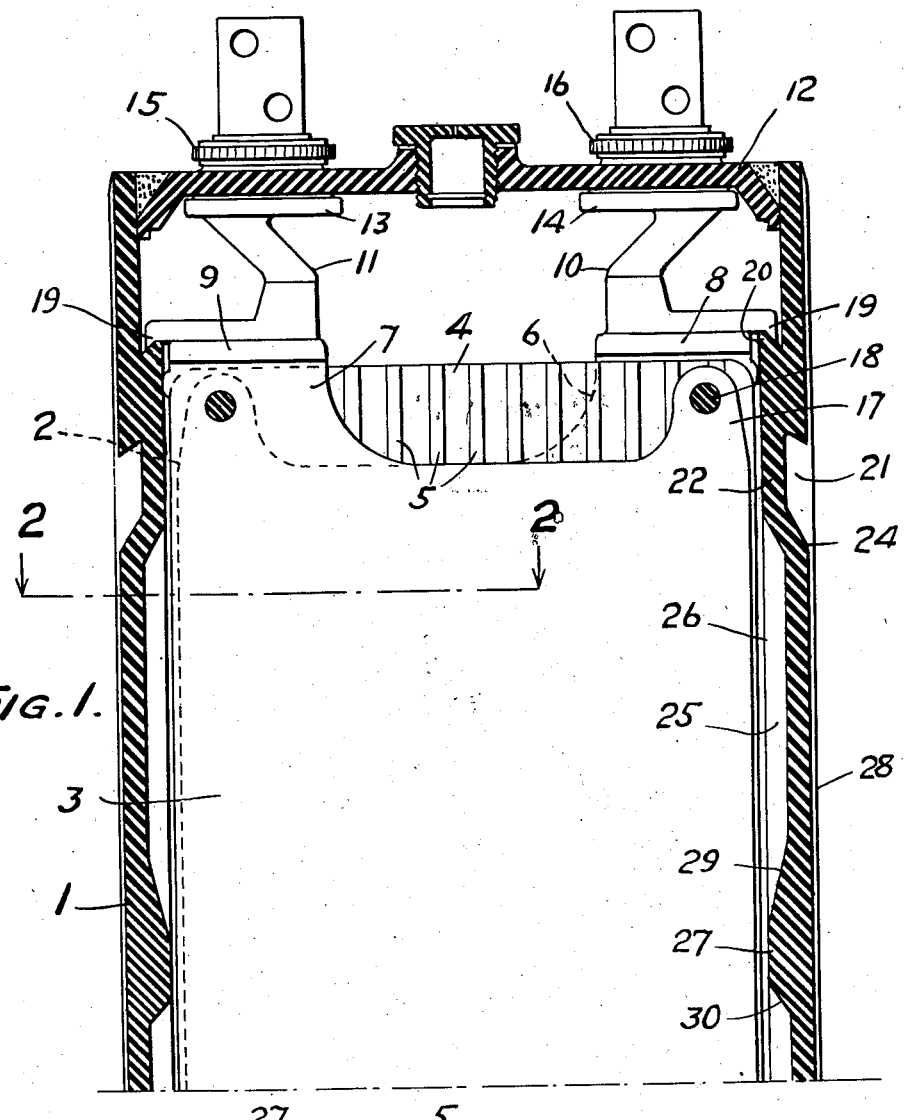
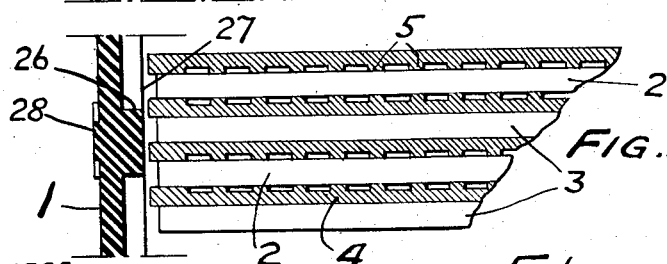
INVENTOR
Edward W. Smith
BY
Augustus B. Stoughton
ATTORNEY.

Patented Apr. 30, 1940

2,199,229

UNITED STATES PATENT OFFICE 2,199,229

STORAGE BATTERY

Edward W. Smith, Philadelphia, Pa., assignor to The Electric Storage Battery Company, Philadelphia, Pa., a corporation of New Jersey Application January 30, 1937, Serial No. 123,159

4 Claims. (Cl. 136—80)

The invention relates to containers for storage battery cells and consists in an improvement to provide for increasing the volume of electrolyte in the cell without increasing the space required and at the same time providing adequate strength and minimum cost of container.

The improvement is particularly applicable to cells designed to meet conditions such as are found in battery installations for submarines where it is desired to obtain maximum capacity in a limited space and where cells of comparatively great height are required. The containers are ordinarily made of hard rubber or similar composition and, on account of the height of the cell and the weight of the elements, the walls of the container must be unusually strong and rigid. With this object in view, it has been customary to design the containers with vertical and horizontal ribs on the outside of the jar walls.

The element consisting of alternately disposed positive and negative plates with suitable separators therebetween is designed to make a snug fit in the container, not only to secure maximum capacity in a given space but also to prevent shifting of the element in the jar under the conditions of vibration and rolling to be met.

It is found in some cases that, with this construction, the amount of electrolyte in the cell is insufficient to provide for the maximum capacity otherwise obtainable from the plates.

The improvement embodied in this invention consists broadly in forming the horizontal and vertical ribs on the inside of the container walls without increasing the over-all dimensions of the cell or reducing the space available for the element.

The nature of the invention and its advantages will be more clearly understood by reference to the following description in connection with the accompanying drawing, in which:

Fig. 1 is a sectional elevation of a cell embodying improvements covered by this invention.

Fig. 2 is a horizontal section on the line, 2—2 of Fig. 1.

In the drawing, 1 represents the wall of the container within which is located the element consisting of the positive plates 2 and the negative plates 3. The adjacent positive and negative plates are separated by the usual separators 4 which, as here shown, are provided with vertical ribs 5. The plates are provided with positive and negative conducting lugs 6, 7, respectively, which are welded to the positive and negative straps 8, 9, these straps being provided with suitable terminal posts 10, 11, passing through openings in the cover 12 to which cover they are clamped between the shoulders 13, 14 and the seal-nuts 15, 16. The conducting lugs extend from one of the upper corners of each plate to the corresponding strap and at the opposite upper corner there is provided a projecting ear 17 perforated to receive a horizontal hard rubber rod 18 which passes through the corresponding ears of all the plates of like polarity and through the conductor lugs of the opposite polarity and through corresponding holes in the separators. The element is thus united in a unitary structure and this is supported in the container by projections 19 from the straps 8 and 9 which rest on horizontal ledges 20 on the inner surface of the jar walls near the top. On the outer surface of the container wall is a horizontal groove 21 which provides means for attaching a gripping-iron when it is desired to lift the cell out of its position in the battery. The vertical wall of the jar below the groove 21 is offset outwardly as at 24 but retaining the same thickness, thus providing a pocket 25 on the inner surface, which affords additional space for electrolyte within the cell. One or more vertical ribs 26 are provided, as shown more clearly in Figure 2, to stiffen and strengthen the container walls and one or more horizontal ribs 27 are also provided for a similar purpose. There may also be provided vertical ribs 28 of comparatively slight depth on the outer walls which serve to locate channel-shaped vertical wedges (not shown in the drawing) which are used to prevent relative motion between adjacent cells. The horizontal ribs 27 are sloped at their upper and lower faces as shown at 29 and 30. The upper slope is designed to prevent any accumulation of sediment which might collect on a horizontal face of this kind and cause a short-circut between adjacent plates. The lower sloping face 30 is useful to prevent any slight projection on the edge of the plate from catching when the element is removed from the container.

It will be noted that the additional space for electrolyte in this design is provided opposite the vertical edges of the plates where it is equally accessible to all of the plates in the cell and their active material by permeating into the spaces between the plates and the separators. Similar pockets may also be provided by similar design in the walls of the container confronting the faces of the outside plates of the element but the electrolyte provided in these pockets has comparatively little access to the plates in the cell, being in contact only with the outside surface of the outside negative plate which is ordinarily comparatively inactive.

The horizontal bars 27 intermediate between the top and bottom of the plates serve the dual purposes of stiffening the jar walls and of holding the edges of the plates and separators in proper relationship, and preventing any substantial bulging of the plate edges beyond the separators.

I do not intend to be limited save as the scope of the prior art and of the attached claims may require.

I claim:

1. A storage battery comprising, a container, and positive and negative plates supported therein, the vertical wall of said container confronting the vertical edges of said plates having a recess on its inner face adjacent its upper edge forming an upwardly facing shoulder adapted to provide support for the plates, said vertical wall having also on its outer surface below said inner recess a second recess providing a downwardly facing shoulder adapted to receive a cell-lifting device, and said vertical wall having on its inner surface below said second recess a third recess confronting the vertical edges of the plates and providing a pocket for surplus electrolyte accessible to the surfaces of all the plates.

2. A storage battery containing electrolyte and comprising, positive plates, negative plates, separators between said plates, and a container composed of insulating material encasing and suspending said plates and said separators and having in its outer surface a horizontal groove and having in its inner surface above the bottom a pocket opposite the vertical edges of said plates and of said separators, said pocket co-operating with said plates and said separators to conduct electrolyte to all faces of said plates, said groove and said pocket being located in staggered relation vertically in the same container wall.

3. A storage battery adapted to utilize to the fullest extent the space enclosed by its overall dimension and containing electrolyte and comprising, positive plates, negative plates, separators between said plates, and a container composed of rigid insulating material encasing and suspending said plates and said separators and having in its inner vertical surface adjacent the top, ledges arranged to receive portions of said plates thereon and to suspend said plates and having in its inner vertical surface above the bottom and beneath said ledges pockets opposite the vertical edges of said plates and of said separators, said pockets co-operating with said plates and with said separators to conduct electrolyte to all faces of said plates.

4. A container for a storage battery element consisting of alternately arranged positive and negative plates with interspersed separators, said container having walls confronting the vertical plate edges of an overall thickness sufficient to provide an upwardly facing shoulder near the top for supporting the plates and said walls having a recess below said shoulder providing a pocket for surplus electrolyte accessible to all the plates from their vertical edges, leaving wall thickness above the shoulder and back of the recess sufficient to provide adequate mechanical strength without external reinforcement.

EDWARD W. SMITH.